Patented Nov. 14, 1933

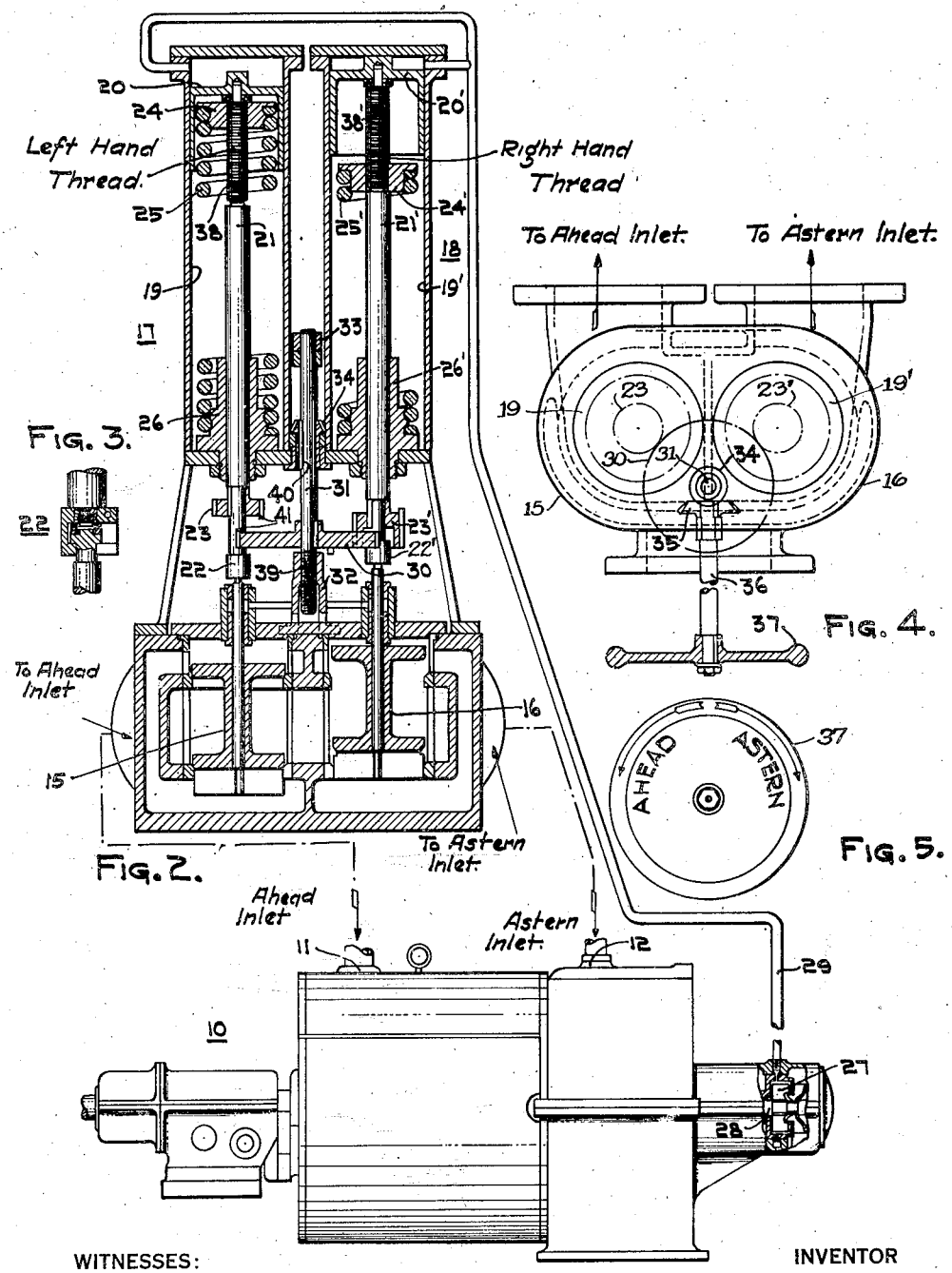

1,935,062

UNITED STATES PATENT OFFICE 1,935,062

GOVERNING MECHANISM

Henry F. Schmidt, Lansdowne, Pa., assignor to Westinghouse Electric & Manufacturing Company, a corporation of Pennsylvania Application April 30, 1931. Serial No. 534,053

7 Claims. (Cl. 264—3)

My invention relates to an operating mechanism for the maneuvering valve of a reversing turbine, and it has for its object to provide a combined governing and maneuvering mechanism for operating such maneuvering valve.

Maneuvering valves of reversing turbines heretofore have generally been operated manually. Such arrangement, in order to obtain rapid change of speed, required initial movement of the valve to a position beyond that corresponding to the speed desired and then a return movement to said corresponding position.

In accordance with my invention, I employ a governor having speed changer means, and preferably of the fluid pressure type, for each of the ahead and astern valves. I provide a mechanism for operating the speed changer means of the governors, said mechanism being operative, upon movement in one direction, to successively decrease the setting of one governor to zero speed setting and then to raise the setting of the other governor from zero speed setting.

This is preferably accomplished by providing a gear for operating each speed changer means and a controlling gear adapted to engage said gears, the controlling gear being movable into engagement with one or the other of said governor gears to vary the speed setting.

The above and other objects are effected by my invention as will be apparent from the following description and claims taken in connection with the accompanying drawing, forming a part of this application, in which;

Fig. 1 is an elevational view of a reversing turbine;

Fig. 2 is a vertical sectional view of the maneuvering valve and operating mechanism for the turbine of Fig. 1;

Fig. 3 shows a detail of the operating mechanism;

Fig. 4 is a plan view of the maneuvering valve and operating mechanism of Fig. 2; and, Fig. 5 shows another detail of the operating mechanism.

Referring now to the drawing more in detail, I show a reversing turbine 10, which may be used wherever motive power in opposite directions is required, particularly in marine propulsion. The turbine 10 has an ahead inlet 11, through which motive fluid is admitted to the ahead section of the turbine for operation thereof in one direction, and an astern inlet 12, through which motive fluid is admitted to the astern section of the turbine effecting operation thereof in the opposite direction.

The motive fluid admission to the ahead inlet is controlled by an ahead admission valve 15, and the motive fluid admission to the astern inlet is controlled by an astern admission valve 16. The ahead and astern admission valves communicate with the ahead and astern inlets, respectively, through suitable conduit means. The aggregate of the ahead and astern admission valves is commonly known in the art as a maneuvering valve.

The valves 15 and 16 are provided with governors 17 and 18, respectively. The governor 17 includes a cylinder 19, a piston 20 in the cylinder, and a piston rod 21 connecting the piston and the valve stem. As the rod 21 is rotatable, ball bearings are interposed in its connections with the piston and the valve stem, the latter connection, designated 22, being shown in detail in Fig. 3. A gear 23 is fixed on the rod 21 for rotating the same. A spring nut 24 is screw-threaded, by left-hand screw-threads 38, on the upper end of the rod 21. A spring 25 has one end fastened to the spring nut 24 and its other end to a spring-holding member 26 fixed in the bottom of the cylinder 19.

The corresponding parts of the governor 18 are designated by the same reference numerals with the prime mark (') added. The governor 18 is similar to the governor 17, except that the screw threads 38' are right-hand threads and the gear 23' is differently disposed as will be further explained.

Fluid pressure varying as the square of the speed of the turbine is developed by an impeller 27 mounted on the turbine shaft 28. It is communicated through a conduit 29 to the upper end of each cylinder, in which it biases the piston downwardly.

A controlling gear 30 is fixedly carried on a shaft 31, which is disposed parallel to the rods 21 and in such position that the gear 30 is adapted, upon proper axial movement, to mesh with either or both of gears 23 and 23'.

The lower end of the shaft 31 is screw-threaded, by right-hand threads 39, in a sleeve 32 mounted on the stationary structure of the maneuvering valve. The upper end of the shaft extends through a guide bearing 33. The shaft 31 extends through a sleeve-like bevel gear 34, which meshes with a bevel gear 35 fixed on a shaft 36. The shaft is slidable longitudinally in the bevel gear but is keyed at 40 against relative rotation.

A handwheel 37 is mounted on the shaft 36 for operating the same.

The fluid pressure governors 17 and 18 operate in the well known manner of a fluid pressure governor. Upon increase in speed, the increased fluid pressure acting on the piston 20 moves the admission valve in closing direction to restrict further increase in speed, the deflection of the spring 25 being increased to oppose the increased fluid pressure and to determine the extent of valve closing movement. Upon decrease in speed, the spring 25 overcomes the decreased fluid pressure and moves the admission valve in opening direction to increase the motive fluid admission.

The speed setting of the governor is varied by rotating the stem 21 to vary the position of the spring nut 24 on the screw-threaded portion of the rod. To increase the speed setting, the spring nut is lowered with respect to the rod 21. This provides increased compression of the spring for a given position of the admission valve, consequently, a higher speed is obtained before the fluid pressure balances the force of the spring. To decrease the speed setting, the nut 24 is raised to decrease the spring compression for a given valve opening.

In the position shown in Fig. 2, it will be noted that the astern valve 16 is wide open and that the spring nut 24' is at the lower end of the screw-threaded portion of the rod 21', thereby providing maximum speed setting of the governor 18. The controlling gear 30, mounted on the shaft 31, is at the lower end of its travel and is in mesh with the gear 23'.

To reduce the speed setting of the astern governor 18, the handwheel 37 is turned in counter-clockwise direction. The shaft 31 is turned in counter-clockwise direction, as viewed in Fig. 4, through the shaft 36 and the gears 34 and 35. The gear 23' is rotated by the controlling gear 30 and turns the rod 21' to raise the position of the spring nut 24' thereon. This movement lowers the speed setting, since a decreased fluid pressure is required to balance the force of the spring 25' at any position of the valve 16.

This operation may be continued until zero speed setting is reached, that is the relative position of the nut 24' and the rod 21' at which the valve 16 is on its seat and there is no compression of the spring 25'. If the turbine is still rotating due to inertia, the fluid pressure developed merely serves to hold the valve 16 against its seat. At this point, the controlling gear 30, which has been moved upwardly by the screw-threads 39, comes into engagement with the gear 23. As shown on the drawing, the spring nut 24 is at the upper end of the screw-threaded portion of the rod 21 and holds the spring 25 under a slight tension so as to hold the valve 15 firmly on its seat.

The controlling gear 30 is now in mesh with both of the gears 23 and 23', and upon further movement thereof in the same direction, it rotates both of said gears in clockwise direction as seen in Fig. 4. This movement raises the spring nut 24' of the governor 18 still further, thereby placing the spring 25' under tension. At the same time, the rotation of the rod 21 by the gear 23 lowers the spring nut 24 of the governor 17 and releases the tension on the spring 25. This movement continues until each of the gears 23 and 23' has made about two turns, at which point the controlling gear 30 disengages the gear 23', leaving the spring 25' in tension and the governor 18 at zero speed setting.

At this point also, the tension of the spring 25 has been released and, upon further downward movement of the nut 24 relative to the rod 21, the speed setting of the governor 17 is raised from zero speed setting. If the turbine is not rotating and there is no fluid pressure, the valve 15 is raised. However, if it is still rotating, the fluid pressure compresses the spring 25 until the compression equals the force of the fluid pressure. Then, upon further movement, the rod 21 is moved upwardly to open the admission valve 15. Ordinarily, the speed of the turbine in astern direction will be rapidly reduced, so that the fluid pressure will be low and an opening movement of the admission valve 15 will be rapidly effected.

If the fluid pressure is zero or relatively low, a few turns of the gear 23, which may be effected by a single turn of the handwheel 37, will be sufficient to open the valve 15 wide, providing full admission of motive fluid to the ahead section of the turbine. As the turbine attains speed in an ahead direction the increased fluid pressure will again close the valve 15 unless the speed setting is still further raised by raising the rod 21 with respect to the spring nut 24.

Upon rotating the controlling member 30 by means of the handwheel 37 to the other end of its travel, the mechanism operates in exactly the reverse manner. The speed setting of the governor 17 is first reduced to zero speed setting; at which point the controlling gear 30 comes into mesh with the gear 23'. The spring 25 is then placed under tension while the tension of the spring 25' is released, after which the controlling gear 30 disengages the gear 23 and raises the speed setting of the governor 18. The controlling gear 30 moves downwardly in this operation.

In order that the gears may always come into engagement in the same relation, the gear teeth which first engage are formed to project slightly as shown at 41. The projection is less than the pitch of one of the screw-threads 39, however, in order to avoid engagement upon the second turn of the gear 30 after disengaging one of the gears 23 and 23'.

The pitch of the screw-threads 39 bears a ratio to the pitch of the screw threads 38 which is at least as great as the gear ratio of the gear 30 to the gear 23, in order to insure that after the gear 30 has moved upwardly into mesh with the gear 23, it will always be in sufficiently raised position to remain in engagement therewith.

From the above description, it will be seen that I have provided a valve operating mechanism whereby the turbine may be stopped or reversed very quickly. A relatively small movement of the handwheel 37, such as one turn thereof, will reduce the speed setting sufficiently so that the fluid pressure will close the valve tightly, and the speed setting can then be fully decreased while the turbine is dropping in speed. Similarly, in bringing up the speed of the turbine, by rotating the handwheel 37 approximately one turn, the speed setting will be increased sufficiently to bring the valve to wide open position, as there is insufficient fluid pressure to balance the force of the spring. The speed setting may then be raised to the desired speed, and the admission valve will be held wide open until the turbine approaches the desired speed, when the piston 20 will begin to move the admission valve to the position required for the desired speed.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with a reversing turbine having an ahead and an astern admission valve, of a governing mechanism therefor comprising a governor having a variable speed setting for each admission valve, a movable controlling member, and means operable upon movement of said member from one end of its travel toward the other to decrease the speed setting of one governor and to close the admission valve controlled thereby and thereafter to raise the speed setting of the other governor and to open the admission valve controlled by the latter.

2. The combination with a prime mover having an ahead admission valve and an astern admission valve, of a governing mechanism therefor comprising a speed-responsive governor for each admission valve, and speed controlling mechanism for said governors, said speed controlling mechanism being operative to successively reduce the speed setting of one governor to zero speed and thereafter to raise the speed setting of the other governor from zero speed.

3. The combination with a reversing turbine having an ahead and an astern admission valve, of a governing mechanism therefor comprising governors for the respective valves, each governor having speed changer means including and operated by a gear, and a controlling gear adapted to operate said gears, the relative arrangement of the gears and the movement of the controlling gear being such that as the controlling gear operates one gear to raise the speed setting of the associated governor from zero speed setting, it moves out of engagement with the other gear, the latter gear then providing zero speed setting of its governor.

4. The combination with a reversing turbine having an ahead and an astern admission valve, of a governing mechanism therefor comprising governors for the respective valves, each governor having speed changer means including and operated by a gear, and an axially movable controlling gear adapted to operate said gears, the relative arrangement of the gears and the movement of the controlling gear being such that in a limited range of movement the controlling gear is in mesh with both gears and effects zero speed setting of both governors and upon movement out of said range in either direction moves out of engagement with one gear, leaving its governor at zero speed setting, and moves the other gear to raise the speed setting of the associated governor above zero speed setting.

5. The combination with a reversing turbine having an ahead and an astern admission valve, of a governing mechanism therefor comprising governors for the respective valves, each governor having speed changer means including and operated by a gear, and a controlling gear adapted to operate said gears, the arrangement of the gears and the movement of the controlling gear being such that but one governor at a time may have a speed setting above zero speed setting and that the controlling gear upon movement in one direction decreases the speed setting of one governor to zero speed setting and then raises the setting of the other governor from zero speed setting.

6. The combination with a reversing turbine having an ahead and an astern admission valve, of a governing mechanism therefor comprising governors for the respective valves, each governor having speed changer means including and operated by a gear, and a controlling gear adapted to operate said gears, the arrangement of the gears and the movement of the controlling gear being such that the controlling gear, at one end of its movement, provides maximum speed setting of one governor and upon movement to the other end decreases said speed setting to zero and thereafter increases the speed setting of the other governor from zero to maximum speed setting.

7. The combination with a reversing turbine having an ahead and an astern admission valve, of a governing mechanism therefor comprising means providing fluid pressure varying as a function of the speed of the turbine, fluid pressure governors for the respective valves, each governor comprising a cylinder, a piston therein, a rotatable rod connecting the piston to the valve, a gear fixed on said rod, a spring nut screw-threaded on said rod, a spring having one end attached to the spring nut and the other end to a stationary part of the governor, and means for admitting said fluid pressure to the cylinder to bias the piston in valve-closing direction, and a controlling gear adapted to engage said gears on the rods, the spring nut of one governor being moved on its rod so that its spring biases the valve in closing direction and the spring nut of the other governor being moved on its rod so that its spring biases the valve in opening direction when the controlling gear is near one end of its travel and vice-versa when the controlling gear is near the other end of its travel.

HENRY F. SCHMIDT.